Figure 1:
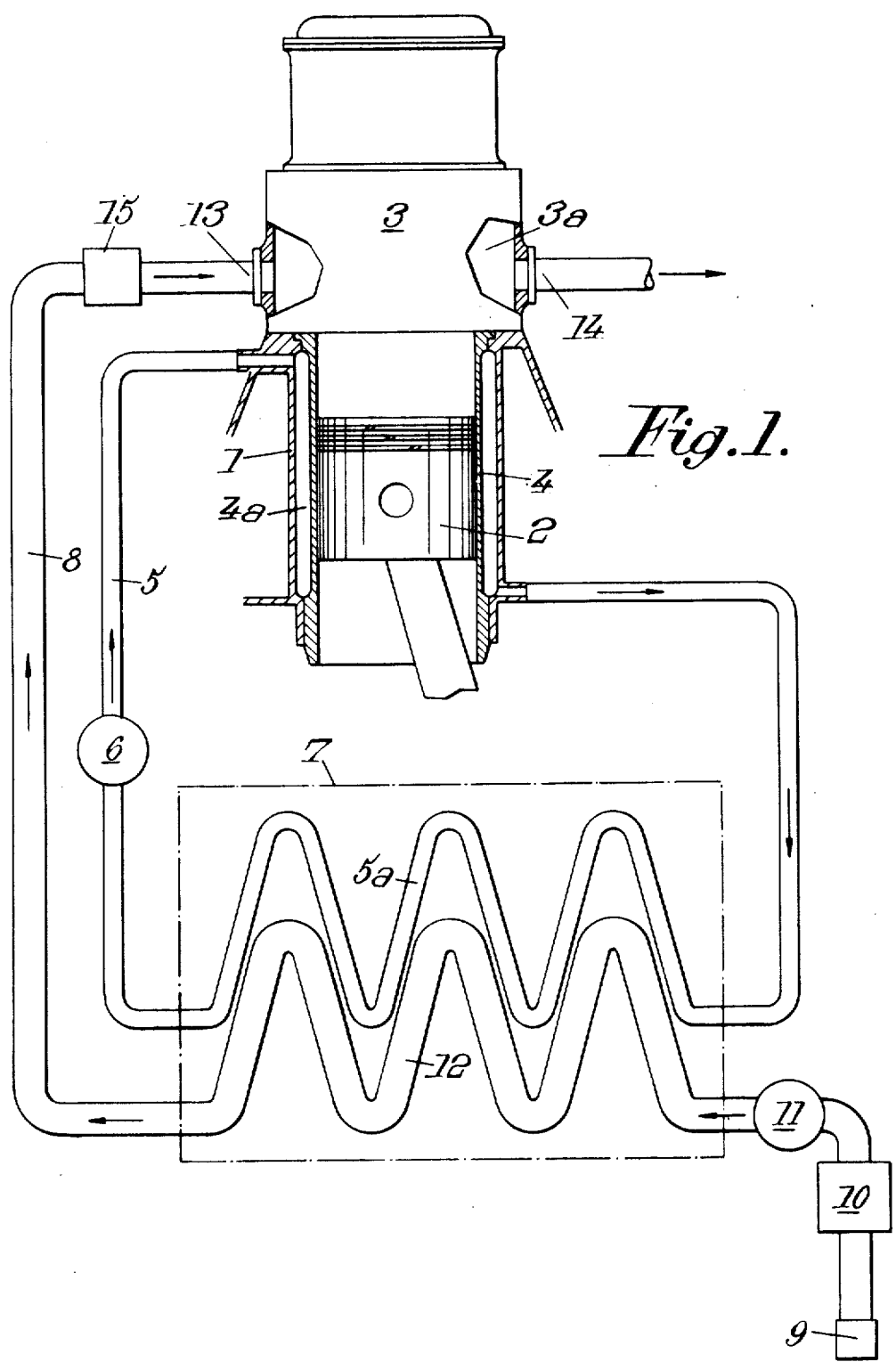

United States Patent [19]
Amiot

[11] 3,892,209
[45] July 1, 1975

[54] LIQUID-COOLED RECIPROCATING ENGINES, MORE PARTICULARLY MARINE ENGINES

[76] Inventor: Felix Amiot, 2, rue Georges Leygues, Paris, France

[22] Filed: Mar. 11, 1974

[21] Appl. No.: 450,159

[30] Foreign Application Priority Data
Apr. 3, 1973   France .............................. 73.11905

[52] U.S. Cl. ....... 123/41.29; 123/41.09; 123/41.71; 123/41.72
[51] Int. Cl. ............................................. F01p 3/00
[58] Field of Search........... 123/41.71, 41.72, 41.29, 123/41.08, 41.09; 165/51

[56]   References Cited
       UNITED STATES PATENTS
| | | | |
|---|---|---|---|
| 2,757,650 | 8/1956 | Holley | 123/41.29 |
| 2,953,125 | 9/1960 | Garcia | 123/41.71 |
| 3,127,879 | 4/1964 | Giacosa | 123/41.72 |
| 3,358,654 | 12/1967 | Shanahan | 123/41.29 |
| 3,667,431 | 6/1972 | Kueny | 123/41.72 |

FOREIGN PATENTS OR APPLICATIONS
| | | | |
|---|---|---|---|
| 168,718 | 3/1906 | Germany | 123/41.29 |
| 1,090,730 | 10/1954 | France | 123/41.29 |

Primary Examiner—Manuel A. Antonakas
Assistant Examiner—Daniel J. O'Connor
Attorney, Agent, or Firm—Larson, Taylor and Hinds

[57]   ABSTRACT

A liquid cooled reciprocating engine, particularly of the high power diesel marine type. The engine head and the engine body are formed of differing materials, and the head material is less prone to corrosion than the body. The cooling system comprises a first closed circuit with heat exchanger for cooling the body and a second open circuit for cooling the head thereof thereby permitting the use of a more corrosive coolant for the head than for the body.

9 Claims, 2 Drawing Figures

LIQUID-COOLED RECIPROCATING ENGINES, MORE PARTICULARLY MARINE ENGINES

The invention relates to liquid-cooled reciprocating engines and particularly to engines of diesel type which develop a relatively high power (for instance, several thousand horse power) and therefore require considerable heat dissipation, especially when engines of the kind specified may be required to operate a full power in tropical areas.

The invention relates especially although not exclusively (because this is where its application seems to have most advantage) to reciprocating engines which are marine engines and where water, such as sea water, is taken from the surrounding medium as is the case in the majority of diesel reciprocating engines with which vessels are equipped.

It has already been suggested that to obviate the corrosion of the internal cooling circuits of marine engines by providing the engine cooling system with a closed circuit containing fresh water for cooling all the elements to be cooled (inter alia cylinders and engine heads), the closed circuit comprising a heat exchanger cooled by raw (sea) water which, in this case, always remains out of contact with said elements to be cooled.

This procedure successfully prevents raw water such as sea water from corroding the walls of the closed engine cooling circuit but, on the other hand, it has the disadvantage of requiring a substantial heat exchanger which takes up a large amount of space, in view of the fact that all the heat to be dissipated must pass through the exchanger.

It is a main object of the invention to obviate this disadvantage - i.e. to provide reciprocating engines with a liquid cooling system having a smaller heat exchanger.

According to this invention there is provided a liquid-cooled reciprocating engine having a head and a body respectively being formed of differing metals and each being provided with cooling chambers, the body being formed of a metal more prone to corrosion than the metal forming the head; and wherein a liquid cooling system for the engine comprises at least two circuits respectively adapted to receive different coolants, a first closed circuit principally for the body of the engine such circuit including a heat exchanger and a second open circuit principally for the head of the engine, the arrangement being such that the coolant for said second open circuit may be more corrosive than the coolant for said closed circuit, said heat exchanger being provided to permit cooling of the coolant of the first closed circuit.

In this way the heat exchanger only has to evacuate the excess heat evolved at the level of the cylinders (and not the considerable heat evolved at the level of the engine head) and the exchanger can thus be smaller, lighter and cheaper than if it had to dissipate the excess heat evolved at both such levels, namely the levels of the cylinders and the engine heads.

Moreover, the engine will have a long life even though the more corrosive coolant is directly used, since such liquid circulates in the open circuit and plays on only the inner walls of the engine heads, which are made of a metallic material which is not particularly sensitive to corrosion, whereas a non-corrosive liquid plays on the more corrosion-sensitive cylinder cooling chamber walls.

In the case of the marine engine, the non-corrosive liquid circulating in the closed circuit will advantageously be fresh water and the more corrosive liquid circulating in the open circuit will be raw water (such as sea water) taken from the surrounding medium and ejected, after passing through the engine heads, into such medium, if necessary after being used in certain ancillary devices, such as exhaust coolers and silencers.

In a first very simple embodiment, therefore, the open circuit, in which the more corrosive liquid circulates, is completely independent of the closed circuit and of the heat exchanger incorporated therein.

However, in a preferable alternative method, at least some of the more corrosive liquid circulating in the open circuit is used to cool, in the exchanger included in the closed circuit, the less corrosive liquid circulating therein. In that case the more corrosive liquid which must cooperate with the exchanger may first pass therethrough and may then be routed to the engine heads to be cooled, the heating of the more corrosive liquid in the exchanger not proving troublesome since it is heated only to a relatively small extent because a considerable flow of such coolant can be provided without disadvantage, in view of the fact that the surrounding medium generally forms an inexhaustible source.

This alternative method can be applied, therefore, either by making all the more corrosive liquid (taken from the surrounding medium for cooling the engine head or heads) pass through the exchanger, or, preferably, by making only some of such more corrosive liquid pass through the exchanger, the other part of the liquid being so tapped off as to rejoin, on leaving the exchanger, the portion of the more corrosive liquid which is passed through the exchanger, the total flow thus reformed being sent to the engine head or heads to be cooled.

In the latter arrangement, in which some of the more corrosive liquid is tapped from the exchanger, enables the efficiency of the exchanger to be adjusted and therefore allows for sufficiently accurate adjustment of the temperature of the less corrosive liquid circulating in the closed circuit for cooling the cylinders, such temperature as a rule advantageously being limited to values of the order of 70°C.

In any event, advantageously the open circuit for cooling the engine head or heads has a control valve enabling the flow of the more corrosive liquid circulating in the open circuit to be adjusted so that the temperature of the engine heads can be kept within a range of temperature suitable for the satisfactory operation of the engine.

Whatever the specific arrangement in accordance with this invention is adopted, advantageously when the more corrosive liquid is taken from the surrounding medium, at least one filter is provided to intersect waste, such filter being disposed at the inlet to the open circuit.

Figure 2:
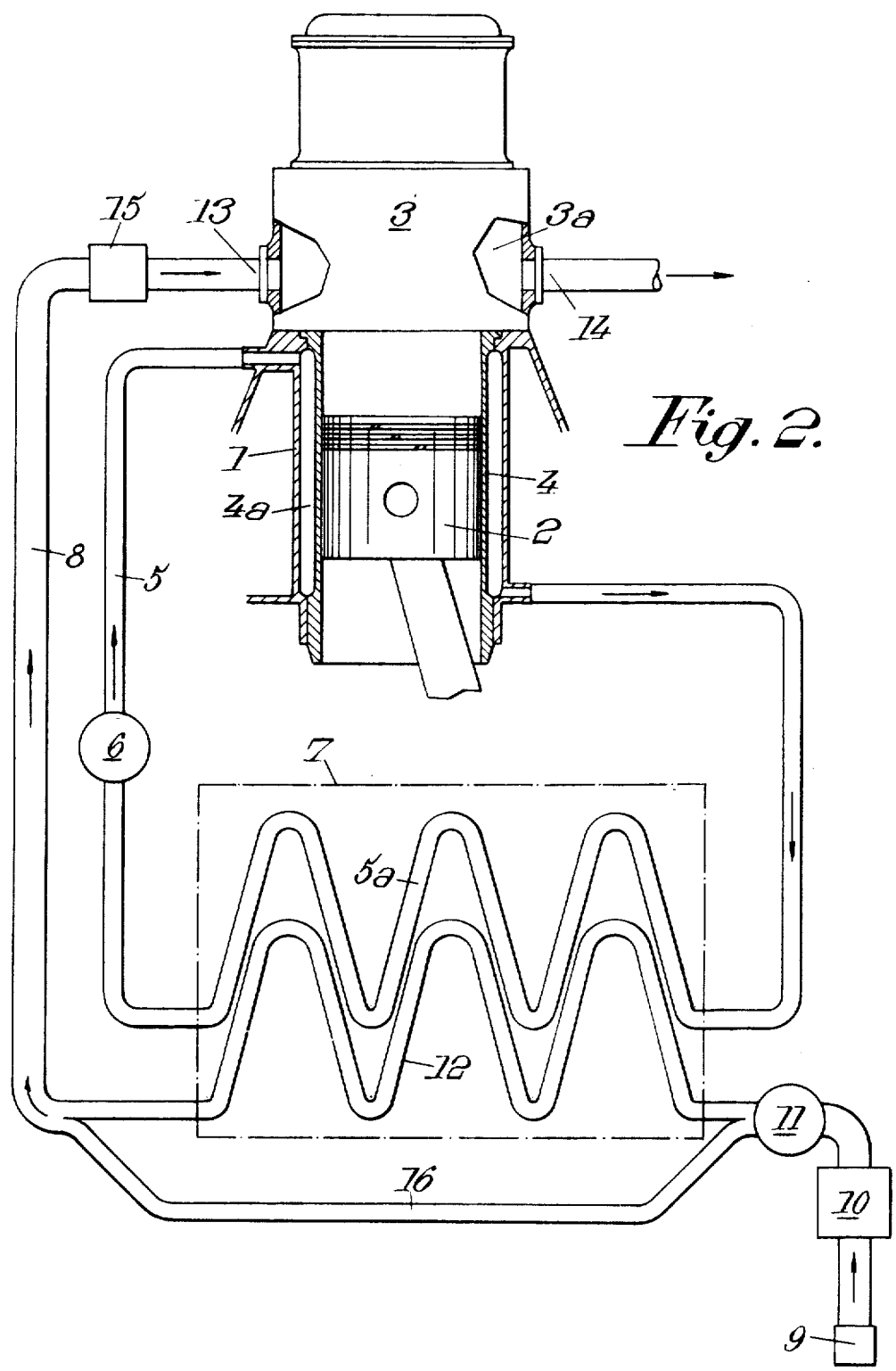

In order that the invention may be more readily understood, and so that further features may be appreciated, two embodiments of engine in accordance with this invention will now be described by way of example, and with reference to, the accompanying drawings in which:

FIGS. 1 and 2 respectively illustrate diagrammatically two embodiments of a cooling system for a diesel-type marine engine.

FIG. 1 shows diagrammatically a first embodiment according to the invention of a very simple diesel-type marine engine comprising a cylinder 1 with piston 2 surmounted by an engine head 3. The head 3 is made of a refractory steel which is not particularly sensitive to corrosion by sea water (even at elevated temperature) and has a cooling chamber 3a covering the hottest part of the engine head (combustion anti-chamber, exhaust gas outlet, valve seats and guides, air manifold etc). The cylinder 1 is made of a lightweight alloy and has a steel or cast iron jacket 4 cooperating with the outside wall of the chamber 1 to define cooling chamber 4a.

The cooling chamber 4a is supplied with fresh cooling water via a closed circuit 5 comprising a pump 6 and a heat exchanger 7 inside which the closed circuit 5 portion is shown diagrammatically by a coil 5a.

The cooling chamber 3a of the engine head 3 is adapted to be supplied with raw (sea) water via an open circuit 8, with a more considerable flow than the closed circuit 5 which comprises, in the direction of flow, a coolant inlet 9 to be submerged in the surrounding medium, a filter 10, a pump 11 and a coil 12 forming the cooling element of the heat exchanger 7, coil 12, valve 15 and inlet duct 13. Raw (sea) water passes from inlet 9, past pump 11 to the coil 12. Such water leaves the coil 12 at luke warm heat and is channelled to an inlet duct 13 for introduction into the engine head cooling chamber 3a, whereafter such water passes through the cooling chamber 3a and is evacuated via a discharge conduit back to the surrounding medium, directly or after passing through ancillary systems.

The adjusting valve 15 enables the flow of liquid circulating in the open circuit to be adjusted and thus enables the temperature of the engine head 3 to be adjusted.

Clearly, a marine engine having the cooling system hereinbefore described, the size of the heat exchanger 7 can be reduced and the corrosion-sensitive parts (inner wall of the lightweight alloy cylinder 1 and outer wall of the jacket 4 of steel not specially treated) are washed only by the less corrosive fresh water.

FIG. 2 shows a second embodiment of the invention and like elements to those illustrated in FIG. 1 have like references. This second embodiment differs from that illustrated in FIG. 1 by the feature that only some of the coolant collected by the inlet 9 is sent through the coil 12 of the exchanger 7, the other part of the liquid being sent via a tapping or by-pass conduit 16 to the outlet from the coil 12 where it is mixed with the liquid which is passed through the coil, the total flow thus reformed being sent to the engine head 3.

With an aim to simplifying the explanation, the application of the invention has just been described to the theoretical case of an engine having only one cylinder, but of course in practice engines, inter alia high power marine engines to which the invention especially relates will comprise a plurality of cylinders and even a number of lines of cylinders, the advantages obtained by the invention being all the more marked the higher the power of the engine.

In some cases, therefore, collectors serving the various cylinders or lines of cylinders may be provided in the closed and open cooling circuits according to the invention.

Thus cooling systems as hereinbefore described may be applied either to individual cylinders and heads; to groups of cylinders and their head or heads; or to the entire engine.

I claim:

1. A liquid-cooled reciprocating engine having a head; and
a body connected to the head;
the head and the body respectively being formed of differing metals;
cooling chambers being provided in said head and body; the body being formed of metal more prone to corrosion than the metal forming the head; and wherein
a liquid cooling system is provided for the engine and said system comprises;
at least a first circuit and a second circuit with means for receiving, respectively, a first coolant in said first circuit and a second coolant, different from said first coolant, in said second circuit, the first circuit being closed and connected in fluid communication with the cooling chamber of said body of the engine, said first circuit including a heat exchanger, and the second circuit being open and connected in fluid communication with the cooling chamber of the said head of the engine;
the arrangement being such that the second coolant for said second open circuit is more corrosive than the first coolant for said first closed circuit;
said heat exchanger being provided to permit cooling of the coolant of the first closed circuit.

2. A liquid-cooled reciprocating engine according to claim 1, of the diesel and marine type.

3. An engine according to claim 1, wherein the closed circuit is provided to contain fresh water and the second open cooling circuit is provided to receive sea water.

4. An engine according to claim 1, wherein the open circuit is completely independent of the closed circuit and its heat exchanger.

5. An engine according to claim 1, wherein the open circuit is so constructed that at least some of the coolant entering such open circuit passes through the heat exchanger of the closed circuit thereby to cool the coolant circulating in such closed circuit.

6. An engine according to claim 5, wherein the open circuit is so constructed that only some of the coolant for such circuit may flow through the heat exchanger incorporated in the closed circuit.

7. An engine according to claim 1 wherein a flow control valve is incorporated in the open circuit.

8. An engine according to claim 1, wherein a filter is provided at an inlet of the open circuit.

9. An engine according to claim 1, including ancillary apparatus to be heated or cooled and wherein provision is made whereby at least some of any coolant which has passed through the open cooling circuit is routed, after leaving the cooling chambers of the engine head, to said ancillary apparatus.

* * * * *